Patented Feb. 5, 1935

1,989,701

UNITED STATES PATENT OFFICE 1,989,701

CELLULOSE DERIVATIVE COMPOSITION

Walter E. Lawson, Wilmington, Del., assignor to E. I. du Pont de Nemours & Company, Wilmington, Del., a corporation of Delaware No Drawing. Application October 3, 1931, Serial No. 566,784

19 Claims. (Cl. 106—40)

This invention relates to new compounds, the process of preparing same, new cellulose derivative compositions containing these compounds and, more particularly, to tetrahydrofurfuryl esters of polycarboxylic acids.

An object of this invention is to provide a method of preparing tetrahydrofurfuryl esters of polycarboxylic acids. Another object is to provide new esters especially adapted for use as softeners in cellulose derivative coating and plastic compositions. Other objects will be apparent from the description of the invention given hereinafter.

The above objects are accomplished according to the present invention by reacting tetrahydrofurfuryl alcohol with a polycarboxylic acid or an ester of a polycarboxylic acid wherein the hydrogen atom of at least one carboxyl group has been replaced by a monovalent radical which ester gives, on hydrolysis, an alcohol having a lower boiling point than tetrahydrofurfuryl alcohol, and removing the water or alcohol formed by the reaction from the reaction zone. The removal of the water or alcohol at substantially the rate it is formed may be effected by carrying out the reaction at an elevated temperature, at a decreased pressure, by blowing an inert gas through the reaction mixture, or by the use of a solvent such as toluene, xylene, et cetera. Obviously, the combination of two or more of these expedients may be used. Catalysts such as sulfuric, hydrochloric, or benzene sulfonic acids, sodium alcoholates, metallic sodium, zinc chloride, and the like, may be and preferably are used to accelerate the rate of the reaction.

The method of preparation of these esters may be varied considerably, but the proportion of tetrahydrofurfuryl alcohol should preferably be in slight excess of the theoretical amount required. It is preferred to keep the reaction temperature between 80–250° C. to carry out the reaction efficiently, although the reaction may be carried out either above or below this range.

The following examples are given to illustrate the preparation of tetrahydrofurfuryl esters of polycarboxylic acids wherein the hydrogen of each carboxyl group of the acid is replaced by a tetrahydrofurfuryl radical:

*Example 1.*—Di-tetrahydrofurfuryl adipate:— A mixture of 146 grams of adipic acid and 250 grams of tetrahydrofurfuryl alcohol is heated to boiling for six hours (200–230° C.) under an air condenser adjusted to allow the water vapor to escape but to condense the other volatiles. The resulting product was distilled in vacuo, 232 grams distilling between 230–250° C. at 7 mm. pressure.

*Example 2.*—Di-tetrahydrofurfuryl phthalate:—A mixture of 450 grams of phthalic anhydride, 700 grams of tetrahydrofurfuryl alcohol, 300 grams toluene, and 9 grams of 98% sulphuric acid is heated to boiling in an apparatus designed to separate the water from the distillate and to return the toluene to the reaction flask. The theoretical amount of water is removed in 4–6 hours. The resulting product is poured into water and washed free of acid with dilute alkali. The product is then distilled in vacuo, 550 grams of tetrahydrofurfuryl phthalate distilling between 265–275° C. at 13 mm. pressure.

In the above examples the initial reaction product may or may not be washed free of acid before distilling. Other compounds readily prepared by the above methods are di-tetrahydrofurfuryl fumarate, distilling between 215–240° C. at 6 mm. pressure, di-tetrahydrofurfuryl succinate, distilling between 230–240° C. at 10 mm. pressure, and di-tetrahydrofurfuryl sebacate, distilling between 240–260° C. at 2 mm. pressure. The process is applicable to polycarboxylic acids in general and is particularly suited to dicarboxylic acids. Among other polybasic acids which may be used in preparing tetrahydrofurfuryl esters are glutaric, pimelic, itaconic, citric, tartaric, and trimesic acids.

The following examples illustrate the preparation of polycarboxylic esters wherein the hydrogen atom of at least one carboxyl group is replaced by a tetrahydrofurfuryl radical and the hydrogen atom of another carboxyl group is replaced by some other monovalent radical, either an aliphatic or aromatic radical, such as the amyl, butyl, ethoxyethyl, butoxyethyl, cyclohexyl, methylcyclohexyl, benzyl, or methoxyethyl radicals:

*Example 3.*—Tetrahydrofurfuryl butyl phthalate:—A mixture of 51 grams of tetrahydrofurfuryl alcohol and 74 grams of phthalic anhydride is heated on a steam bath until reaction to form the acid phthalate (that is, the half ester) has taken place. To this mixture 155 grams of butyl alcohol and 0.5 grams of sulphuric acid are added. The mixture is distilled in such an apparatus as used in Example 2 until the theoretical amount of water has been removed. The product is then washed with sodium carbonate to remove excess acid and then vacuum distilled. Tetrahydrofurfuryl butyl phthalate distills at 200–210° C. at 3 mm. pressure.

*Example 4.*—Tetrahydrofurfuryl methoxyethyl adipate:—A mixture of 262 grams of methoxyethyl adipate and 102 grams of tetrahydrofurfuryl alcohol containing 0.4 grams of dissolved sodium is heated under a fractionating column until 75 grams of methoxyethanol is distilled out. The resulting product is then washed with water to remove sodium compounds, dried, and decolorized by heating at 150° C. at 20 mm. pressure in the presence of decolorizing carbon. The filtered product, tetrahydrofurfuryl methoxyethyl adipate, is pale amber in color.

*Example 5.*—Tetrahydrofurfuryl benzyl phthalate:—A mixture of 208 grams of butyl benzyl phthalate and 68 grams tetrahydrofurfuryl alcohol containing 0.4 grams of sodium is heated under a fractionating column until the theoretical amount of butyl alcohol has been removed. The product is then purified as in Example 4.

Mixed esters can likewise be made by refluxing an acid ester of a polycarboxylic acid with tetrahydrofurfuryl alcohol, with or without a catalyst, and with or without a diluent such as toluene, xylene, benzene, et cetera.

The removal of the water can be effected by blowing a gas, preferably an inert one, such as nitrogen, through the refluxing liquid. Other methods, such as the removal of water as steam by regulation of reflux condensation, or that in which the water is removed, in a binary mixture with a carrier liquid such as toluene or xylene, which is separated from the water and returned to the reaction mixture, have been described above in connection with the preparation of tetrahydrofurfuryl esters from polycarboxylic acids or esters thereof with alcohols boiling at a lower temperature than tetrahydrofurfuryl alcohol.

Mixed esters can also be made from neutral esters, even those from alcohols of higher boiling point than tetrahydrofurfuryl alcohol, e. g., stearyl alcohol, by refluxing with the appropriate quantity of tetrahydrofurfuryl alcohol for 3 to 6 hours in the presence of a catalyst. The resulting product then consists of a mixture of varying proportions of the mixed esters, e. g., tetrahydrofurfuryl stearyl phthalate, the alcohol of the original esters, e. g., stearyl alcohol and tetrahydrofurfuryl alcohol. These can be separated by the use of appropriate solvents or by fractional distillation preferably at reduced pressure or by a combination of these steps.

The preparation of these mixed esters affords the opportunity of obtaining esters whose properties, e. g., boiling point, volatility at ordinary temperature, water-resistance and plasticizing power, vary over a wide range. Thus by choosing the proper second alcoholic component from methyl to stearyl in the aliphatic series, phenyl, naphthyl, et cetera, in the aromatic series, methoxy methyl to lauroxyethyl in the aliphatic ether alcohol series, et cetera, the compatibility with cellulose derivatives may be varied from the great compatibility with cellulose ethers, cellulose acetate and cellulose nitrate shown by mixed esters derived from lower boiling alcohols such as methyl, ethyl, methoxy ethyl to somewhat lessened compatibility for cellulose ethers and cellulose nitrate and greatly lessened compatibility for cellulose acetate shown by mixed esters from higher boiling alcohols such as lauroxyethyl, stearyl, naphthyl, et cetera.

Included within the scope of this invention are the esters of polycarboxylic acids wherein the hydrogen atom of at least one carboxyl group is replaced by a tetrahydrofurfuryl radical, and the esters wherein the hydrogen atom of each carboxyl group of the polybasic acid is replaced by a tetrahydrofurfuryl radical. As shown in the above examples, the mixed esters wherein the hydrogen atom of one carboxyl group of the polybasic acid is replaced by a tetrahydrofurfuryl radical and the hydrogen atom of another carboxyl group is replaced by any other monovalent radical, such as the phenyl, amyl, cyclohexyl, ethoxyethyl, butyl, benzyl, methoxyethyl, and similar radicals, are also included in the present invention.

The esters coming within this invention are water-white to pale amber liquids which possess high boiling points and are very compatible with cellulose derivatives. They are of particular interest for use as softeners for cellulose acetate, due to the fact that they are compatible with cellulose acetate in exceptionally high amounts. These esters are particularly useful as softeners in cellulose derivative compositions due to the fact that they are soluble in the ordinary lacquer solvents, do not give cellulose derivative compositions which darken on standing, and impart water-resistant properties to such compositions.

The following examples are given to illustrate typical coating compositions containing esters of the present invention as plasticizers:

*Example 6*

|  | Parts |
|---|---|
| Cellulose nitrate | 12 |
| Damar | 3 |
| Di-tetrahydrofurfuryl butyl phthalate | 4 |
| Castor oil | 2.6 |
| Solvent | 166.5 |

*Example 7*

|  | Parts |
|---|---|
| Cellulose nitrate | 12 |
| Damar | 4 |
| Di-tetrahydrofurfuryl sebacate | 6.6 |
| Solvent | 166.5 |

*Example 8*

|  | Parts |
|---|---|
| Cellulose acetate | 12 |
| Tetrahydrofurfuryl methoxy-ethyl adipate | 6 |
| Solvent | 182 |

*Example 9*

|  | Parts |
|---|---|
| Nitrocellulose | 12 |
| Pigment | 16.3 |
| Damar | 3.5 |
| Castor oil | 2.6 |
| Di-tetrahydrofurfuryl fumarate | 4.0 |
| Solvent | 161.6 |

*Example 10*

|  | Parts |
|---|---|
| Benzyl cellulose | 12 |
| Di-tetrahydrofurfuryl succinate | 3 |
| Solvent | 120 |

*Example 11*

|  | Parts |
|---|---|
| Nitrocellulose | 1 |
| Cellulose acetate | 1 |
| Di-tetrahydrofurfuryl phthalate | 1 |
| Solvent | 15 |

The composition disclosed in Example 11 above gives a particularly tough, flexible film which is much less flammable than ordinary pyroxylin films and consequently is very advantageous for photographic films, toilet articles, et cetera. The property of the esters of the present invention to blend cellulose acetate and cellulose nitrate is very valuable due to the reduction in fire hazard of these mixed cellulose nitrate-cellulose acetate compositions, as compared with cellulose nitrate compositions.

In the above examples the term "solvent" is used to designate any suitable mixture of esters, alcohols, and hydrocarbons, such as would be obvious to those skilled in the art. It should also be understood that other resins beside damar, such as ester gum and synthetic resins of the polyhydric alcohol-polybasic acid type, may be used in the above compositions, and that known softeners may be used to replace in part the tetrahydrofurfuryl esters disclosed. Other oils, such as linseed, China-wood and soya bean oils, may be used.

The following examples illustrate typical plastic compositions containing the esters of the present invention as softeners:

Example 12

| | Parts |
|---|---|
| Cellulose acetate | 100 |
| Tetrahydrofurfuryl benzyl phthalate | 40 |

Example 13

| | Parts |
|---|---|
| Cellulose nitro-acetate | 100 |
| Di-tetrahydrofurfuryl fumarate | 35 |

Example 14

| | Parts |
|---|---|
| Benzyl cellulose | 100 |
| Di-tetrahydrofurfuryl succinate | 15 |

Example 15

| | Parts |
|---|---|
| Cellulose butyrate | 100 |
| Di-tetrahydrofurfuryl sebacate | 30 |

Example 16

| | Parts |
|---|---|
| Cellulose propionate | 100 |
| Tetrahydrofurfuryl methoxyethyl adipate | 60 |

Example 17

| | Parts |
|---|---|
| Cellulose acetobutyrate | 100 |
| Di-tetrahydrofurfuryl phthalate | 20 |

Example 18

| | Parts |
|---|---|
| Cellulose acetate | 100 |
| Di-tetrahydrofurfuryl adipate | 60 |
| Filler (including color) | 200 |

Example 19

| | Parts |
|---|---|
| Cellulose nitrate | 100 |
| Di-tetrahydrofurfuryl sebacate | 50 |
| Filler (including color) | 200 |

Example 20

| | Parts |
|---|---|
| Cellulose acetate | 100 |
| Cellulose nitrate | 100 |
| Di-tetrahydrofurfuryl phthalate | 90 |

Example 21

| | Parts |
|---|---|
| Ethyl cellulose | 100 |
| Tetrahydrofurfuryl butyl phthalate | 20 |

The above compositions may be prepared with or without the usual volatile solvents or diluents, such as alcohol for cellulose nitrate compositions, acetone for cellulose acetate compositions, and toluol-alcohol mixtures for cellulose ether compositions. In these plastic compositions part of the softener may be replaced by the common softeners heretofore known, such as triacetin, dimethyl phthalate, acetanilid, triphenyl phosphate, et cetera, in the cellulose acetate compositions, and camphor, dibutyl phthalate, tricresyl phosphate, et cetera, in the cellulose nitrate compositions.

As shown by the above examples, the esters of the present invention may be used in the preparation of all types of compositions containing cellulose esters or ethers. In particular, they are useful in the preparation of lacquers for coating metal, leather, paper, and wood, in dopes for coating fabrics, and in plastic compositions to be used in the preparation of toilet ware, novelties, sheeting, rods, tubes, photographic films, safety glass, et cetera.

The esters of the present invention are of value as softeners for cellulose derivative compositions due to the water-resistant properties they impart to such compositions. Due to their low vapor pressure and high boiling points, they give permanently flexible products having excellent durability. The fact that they are much more compatible with cellulose acetate than ordinary plasticizers makes them of particular value.

Not only are the esters of the present invention suitable for use in combination with cellulose derivatives as coating and plastic compositions, but also as plasticizers for propellent powders and explosives.

The following examples illustrate typical propellent powder compositions including the esters herein described:—

Example 22

| | Parts |
|---|---|
| Nitrocellulose of about 13.15% nitrogen | 85 |
| Dinitrotoluene | 10 |
| Di-tetrahydrofurfuryl adipate | 5 |
| Diphenylamine | 1 |

Example 23

| | Parts |
|---|---|
| Nitrocellulose of about 13.15% nitrogen | 85 |
| Dinitrotoluene | 10 |
| Di-tetrahydrofurfuryl fumarate | 5 |
| Diphenylamine | 1 |

Example 24

| | Parts |
|---|---|
| Nitrocellulose of about 13.15% nitrogen | 85 |
| Dinitrotoluene | 10 |
| Di-tetrahydrofurfuryl phthalate | 5 |
| Diphenylamine | 1 |

The nitrocellulose used may be nitrocellulose obtained in a single nitration or a blend of nitrocellulose of the type soluble in ether-alcohol with a nitrogen content of about 12.50 to 12.80% with nitrocellulose of the insoluble type, that is, with relatively low solubility in ether-alcohol and with a nitrogen content in excess of 13.00%. While in the examples given above nitrocellulose of about 13.15% nitrogen is shown, it should be understood that the invention is not limited to such but includes the use of nitrocellulose of considerably lower or higher nitrogen content, for example, from about 12.50 to about 14.00%.

The manufacture of powders shown in Examples 22, 23 and 24 presents no difficulties. The nitrocellulose is dehydrated with ethyl-alcohol and then colloided in a suitable mixer by the addition of ether, using approximately two parts of ether to one part of alcohol. The other ingredients are usually added at the mixer. The colloid may be pressed either in cylindrical grain with one or more perforations, or without perforations, or in the ribbon or strip form of grain, or any other kind.

The dinitrotoluene may also be omitted, or other polynitroaromatic compounds, such as dinitrobenzene, trinitrobenzene, trinitrotoluene, dinitroxylene, trinitroxylene, dinitromesitylene, trinitromesitylene, dinitroanisol and trinitroanisol may be used.

Stabilizing agents other than diphenylamine may be used, such as diphenyldiethylurea, diphenyldimethylurea, methylethyldiphenylurea, urea, et cetera.

Smokeless powder containing these compounds is less hygroscopic and therefore more resistant to atmospheric conditions than powder prepared without their use. These compounds also act to reduce the temperature of combustion of the powder and therefore it is possible in many instances to obtain flashless results. For example, flashless results were given by powders of the composition shown in Examples 22, 23 and 24 in the 75 M/M Field Gun Model of 1897 using the 13.5 pound projectile. The tetrahydrofurfuryl esters of polycarboxylic acids are not only compounds of high chemical stability themselves, but being solvents for nitrocelluloses of the higher nitrogen content used in smokeless powder, and especially so when mixed with polynitroaromatic compounds, colloid the nitrocellulose and prevent its deterioration much more effectively than ether-alcohol, which has solvent action on only a portion of the nitrocellulose.

These esters may be used advantageously also in propellent explosives containing nitroglycerin, and in blasting explosives comprising nitroglycerin in predominating proportions and cellulose nitrate for their plasticizing effect.

As many apparently widely different embodiments of this invention may be made without departing from the spirit and scope thereof, it is to be understood that I do not limit myself to the specific embodiments thereof except as defined in the appended claims.

I claim:

1. A composition comprising a cellulose derivative and, as a plasticizer therefor, an ester of a polycarboxylic acid wherein the hydrogen atom of at least one carboxyl group is replaced by a tetrahydrofurfuryl radical.

2. A composition comprising cellulose acetate and, as a plasticizer therefor, an ester of a polycarboxylic acid wherein the hydrogen atom of at least one carboxyl group is replaced by a tetrahydrofurfuryl radical.

3. A composition comprising cellulose acetate and cellulose nitrate, and as a plasticizer therefor, an ester of a polycarboxylic acid wherein the hydrogen atom of at least one carboxyl group is replaced by a tetrahydrofurfuryl radical.

4. A composition comprising a cellulose derivative and, as a plasticizer therefor, an ester of a polycarboxylic acid wherein the hydrogen atom of at least one carboxyl group is replaced by a tetrahydrofurfuryl radical and the hydrogen atom of at least one other carboxyl group is replaced by a monovalent organic radical.

5. A composition comprising a cellulose derivative and, as a plasticizer therefor, an ester of a dicarboxylic acid wherein the hydrogen atom of at least one carboxyl group is replaced by a tetrahydrofurfuryl radical.

6. A composition comprising a cellulose derivative and, as a plasticizer therefor, an ester of a dicarboxylic acid wherein the hydrogen atom of one carboxyl group is replaced by a tetrahydrofurfuryl radical and the hydrogen atom of the other carboxyl group is replaced by a monovalent organic radical.

7. A composition comprising a cellulose derivative and, as a plasticizer therefor, an ester of a dicarboxylic acid wherein the hydrogen atom of each hydroxyl group is replaced by a tetrahydrofurfuryl radical.

8. A composition comprising a cellulose derivative and, as a plasticizer therefor, an ester of a dicarboxylic acid from the group consisting of phthalic, sebacic, and adipic acids wherein the hydrogen atom of at least one carboxyl group is replaced by a tetrahydrofurfuryl radical.

9. A composition comprising a cellulose derivative and, as a plasticizer therefor, tetrahydrofurfuryl butyl phthalate.

10. A composition comprising a cellulose derivative and, as a plasticizer therefor, di-tetrahydrofurfuryl phthalate.

11. A composition comprising a cellulose derivative and, as a plasticizer therefor, di-tetrahydrofurfuryl adipate.

12. A composition comprising cellulose acetate and, as a plasticizer therefor, an ester of a polycarboxylic acid wherein the hydrogen atom of at least one carboxyl group is replaced by a tetrahydrofurfuryl radical and the hydrogen atom of at least one other carboxyl group is replaced by a monovalent organic radical.

13. A composition comprising cellulose acetate and, as a plasticizer therefor, an ester of a dicarboxylic acid wherein the hydrogen atom of at least one carboxyl group is replaced by a tetrahydrofurfuryl radical.

14. A composition comprising cellulose acetate and, as a plasticizer therefor, an ester of a dicarboxylic acid wherein the hydrogen atom of one carboxyl group is replaced by a tetrahydrofurfuryl radical and the hydrogen atom of the other carboxyl group is replaced by a monovalent organic radical.

15. A composition comprising cellulose acetate and, as a plasticizer therefor, an ester of a dicarboxylic acid wherein the hydrogen atom of each hydroxyl group is replaced by a tetrahydrofurfuryl radical.

16. A composition comprising cellulose acetate and, as a plasticizer therefor, an ester of a dicarboxylic acid from the group consisting of phthalic, sebacic, and adipic acids wherein the hydrogen atom of at least one carboxyl group is replaced by a tetrahydrofurfuryl radical.

17. A composition comprising cellulose acetate and, as a plasticizer therefor, tetrahydrofurfuryl butyl phthalate.

18. A composition comprising cellulose acetate and, as a plasticizer therefor, di-tetrahydrofurfuryl phthalate.

19. A composition comprising cellulose acetate and, as a plasticizer therefor, di-tetrahydrofurfuryl adipate.

WALTER E. LAWSON.